United States Patent [19]

Ernst

[11] Patent Number: 5,912,088
[45] Date of Patent: Jun. 15, 1999

[54] GRADIENT ISOLATOR FOR FLOW FIELD OF FUEL CELL ASSEMBLY

[75] Inventor: William D. Ernst, Troy, N.Y.

[73] Assignee: Plug Power, L.L.C., Latham, N.Y.

[21] Appl. No.: 08/958,163

[22] Filed: Oct. 28, 1997

[51] Int. Cl.$^6$ ................................................ H01M 2/08
[52] U.S. Cl. .................................. 429/35; 429/38; 429/39; 429/34
[58] Field of Search .................................. 429/34, 35, 36, 429/38, 39

[56] References Cited

U.S. PATENT DOCUMENTS

| | | | |
|---|---|---|---|
| 3,867,206 | 2/1975 | Trocciola et al. | 136/86 D |
| 4,160,067 | 7/1979 | Camara et al. | 429/16 |
| 4,781,727 | 11/1988 | Mitsuda et al. | 429/35 |
| 4,786,568 | 11/1988 | Elmore et al. | 429/44 |
| 4,794,055 | 12/1988 | Matsumura et al. | 429/35 |
| 4,997,726 | 3/1991 | Akiyama et al. | 429/32 |
| 5,079,104 | 1/1992 | Roche et al. | 429/18 |
| 5,110,691 | 5/1992 | Krasij et al. | 429/35 |
| 5,156,929 | 10/1992 | Dec et al. | 429/35 |
| 5,262,250 | 11/1993 | Watanabe | 429/33 |
| 5,270,132 | 12/1993 | Breault et al. | 429/35 |
| 5,523,175 | 6/1996 | Beal et al. | 429/38 |
| 5,529,855 | 6/1996 | Watanabe | 429/34 |
| 5,558,955 | 9/1996 | Breault et al. | 429/38 |
| 5,624,769 | 4/1997 | Li et al. | 429/32 |
| 5,789,094 | 8/1998 | Kusunoki et al. | 429/35 |
| 5,837,395 | 11/1998 | Breault et al. | 429/35 |

*Primary Examiner*—Bruce F. Bell
*Attorney, Agent, or Firm*—Heslin & Rothenberg, P.C.

[57] ABSTRACT

Isolator(s) include isolating material and optionally gasketing material strategically positioned within a fuel cell assembly. The isolating material is disposed between a solid electrolyte and a metal flow field plate. Reactant fluid carried by flow field plate channel(s) forms a generally transverse electrochemical gradient. The isolator(s) serve to isolate electrochemically a portion of the flow field plate, for example, transversely outward from the channel(s), from the electrochemical gradient. Further, the isolator(s) serve to protect a portion of the solid electrolyte from metallic ions.

20 Claims, 3 Drawing Sheets

GRADIENT ISOLATOR FOR FLOW FIELD OF FUEL CELL ASSEMBLY

STATEMENT OF GOVERNMENT RIGHTS

The Government of the United States of America has rights in this invention pursuant to Contract No. DE-AC02-94CE50389 awarded by the U.S. Department of Energy.

TECHNICAL FIELD

This invention relates, generally, to fuel cell assemblies and, more particularly, to protection of fuel cells against harm from electrochemical gradients.

BACKGROUND ART

Fuel cells electrochemically convert fuels and oxidants to electricity, and fuel cells can be categorized according to the type of electrolyte (e.g., solid oxide, molten carbonate, alkaline, phosphoric acid, or solid polymer) used to accommodate ion transfer during operation. Moreover, fuel cell assemblies can be employed in many (e.g., automotive to aerospace to industrial) environments, for multiple applications.

A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of the reactant fluids (e.g., hydrogen and air/oxygen gases). Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

Usually, an individual PEM-type fuel cell has multiple, generally transversely extending layers assembled in a longitudinal direction. In the typical fuel cell assembly or stack, all layers which extend to the periphery of the fuel cells have holes therethrough for alignment and formation of fluid manifolds that generally service fluids for the stack. As is known in the art, some of the fluid manifolds distribute fuel (e.g., hydrogen) and oxidant (e.g., air/oxygen) to, and remove unused fuel and oxidant as well as product water from, fluid flow plates which serve as flow field plates of each fuel cell. Also, other fluid manifolds circulate coolant (e.g., water) for cooling. A particular fluid flow plate might be a bipolar, monopolar, combined monopolar (e.g., anode cooler or cathode cooler), or cooling plate.

As is known in the art, the PEM can work more effectively if it is wet. Conversely, once any area of the PEM dries out, the fuel cell does not generate any product water in that area because the electrochemical reaction there stops. Undesirably, this drying out can progressively march across the PEM until the fuel cell fails completely. So, the fuel and oxidant fed to each fuel cell are usually humidified. Furthermore, a cooling mechanism is commonly employed for removal of heat generated during operation of the fuel cells.

It has been recognized that flow field plates are susceptible to dissolution or embrittlement. It has been further recognized that light weight metals such as aluminum and titanium and their alloys provide improved electrical and thermal conductivity over use of graphite in forming flow field plates. Moreover, it has been recognized that the use of these light weight metals in flow field plates can present shortcomings which include a relatively rapid rate of deterioration and/or the formation of oxide films with relatively high electronic resistance.

One known configuration for a fuel cell plate forms a core from aluminum or titanium. A protective coating of stainless steel is placed atop the core. The protective coating is covered with a titanium nitride topcoat having a plurality of defects therein. The defects in the topcoat expose the protective coating to a corrosive operating environment in the fuel cell. The protective coating includes chromium, nickel, and molybdenum for oxidative passivation at the exposed locations in order to protect the core against corrosion. Such a design is disclosed in U.S. Pat. No. 5,624,769 to Li et al. (entitled "Corrosion Resistant PEM Fuel Cell," issued Apr. 29, 1997, and assigned to General Motors Corporation).

However, a need exists for reducing problems associated with corrosion of flow field plates having an exterior which is susceptible to corrosion. A further need exists for reducing damage to the fuel cell assembly because of electrochemical gradients therein.

SUMMARY OF THE INVENTION

Pursuant to the present invention, the shortcomings of the prior art are overcome and additional advantages provided through the provision of isolator(s) in a fuel cell assembly which serve to prevent both mechanical and/or chemical deterioration of a solid electrolyte and also corrosion of flow field plates.

According to the present invention, an isolator includes isolating material strategically positioned within a fuel cell assembly having a longitudinal axis. A flow field plate extends generally transversely at a first position along the longitudinal axis. A solid electrolyte extends generally transversely at a second position along the longitudinal axis. The isolating material is disposed between a first section of the solid electrolyte and a second section of an exterior face of the flow field plate. The second section of the flow field plate includes an effective boundary between first and second parts thereof. The first part of the flow field plate includes a flow field channel thereon for carrying fluid. Reactant fluid carried by the flow field channel forms a generally transverse electrochemical gradient across the effective boundary. The isolating material serves to isolate electrochemically a portion of the second part of the flow field plate from the generally transverse electrochemical gradient.

The flow field plate can be formed from one or more metals. The isolating material can serve to protect a portion of the first section of the solid electrolyte from metallic ions.

A portion of the isolating material can extend generally transversely over a portion of the flow field channel. The isolating material can extend largely along a perimeter of the face. The isolating material can be mechanically coupled to the second section of the flow field plate. The isolating material can include epoxy and/or enamel.

The solid electrolyte can include a solid polymer electrolyte. The solid electrolyte and the flow field plate can comprise a portion of a PEM-type fuel cell.

The flow field plate can include stainless steel and/or aluminum. A gas diffusion layer can be disposed between the first section of the solid electrolyte and the second section of the flow field plate.

The first part of the flow field plate can include a plurality of substantially parallel and generally serpentine flow field channels thereon. The isolating material can largely circumscribe a plurality of generally serpentine flow field channels on the first part of the flow field plate.

In another embodiment of the invention, an isolator includes isolating material and gasketing material strategically positioned within a fuel cell assembly having a longitudinal axis. A flow field plate extends generally transversely at a first position along the longitudinal axis. A solid electrolyte extends generally transversely at a second position along the longitudinal axis. The isolating material is disposed between a first section of the solid electrolyte and a second section of an exterior face of the flow field plate. The second section of the flow field plate includes an effective boundary between first and second parts thereof. The gasketing material is disposed between the first section of the solid electrolyte and the second part of the flow field plate. A portion of the isolating material is disposed between the gasketing material and the second part of the flow field plate. The first part of the flow field plate includes a flow field channel thereon for carrying fluid. Reactant fluid carried by the flow field channel forms a generally transverse electrochemical gradient across the effective boundary. The isolating material and/or the gasketing material serve to isolate electrochemically a portion of the second part of the flow field plate from the generally transverse electrochemical gradient.

The flow field plate can be formed from one or more metals. The isolating material and/or the gasketing material can serve to protect a portion of the first section of the solid electrolyte from metallic ions.

A portion of the isolating material can extend generally transversely over a portion of the flow field channel. The isolating material and/or the gasketing material can extend largely along a perimeter of the face.

The isolating material can be mechanically coupled to the second section of the flow field plate. A gas diffusion layer can be disposed between the first section of the solid electrolyte and the second section of the flow field plate.

The isolating material and/or the gasketing material can largely circumscribe a plurality of generally serpentine flow field channels on the first part of the flow field plate.

The invention further contemplates a method of isolating a generally transverse electrochemical gradient in a fuel cell assembly. A flow field plate extends generally transversely at a first position along a longitudinal axis of the fuel cell assembly. A solid electrolyte extends generally transversely at a second position along the longitudinal axis. Isolating material is disposed between a first section of the solid electrolyte and a second section of an exterior face of the flow field plate. The second section of the flow field plate includes an effective boundary between first and second parts thereof. A flow field channel for carrying fluid is formed on the first part of the flow field plate. Reactant fluid carried by the flow field channel forms a generally transverse electrochemical gradient across the effective boundary. The isolating material serves to isolate electrochemically a portion of the second part of the flow field plate from the generally transverse electrochemical gradient.

Thus, the present invention advantageously provides reduced damage to a fuel cell assembly because of generally transverse electrochemical gradients therein.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a fuel cell assembly is provided in which isolator(s) disposed over flow field face(s) at position(s) generally transversely outward from flow field channel(s) serve to reduce damage, especially to membrane(s) and flow field plate(s), because of electrochemical gradient(s).

Figure 1:
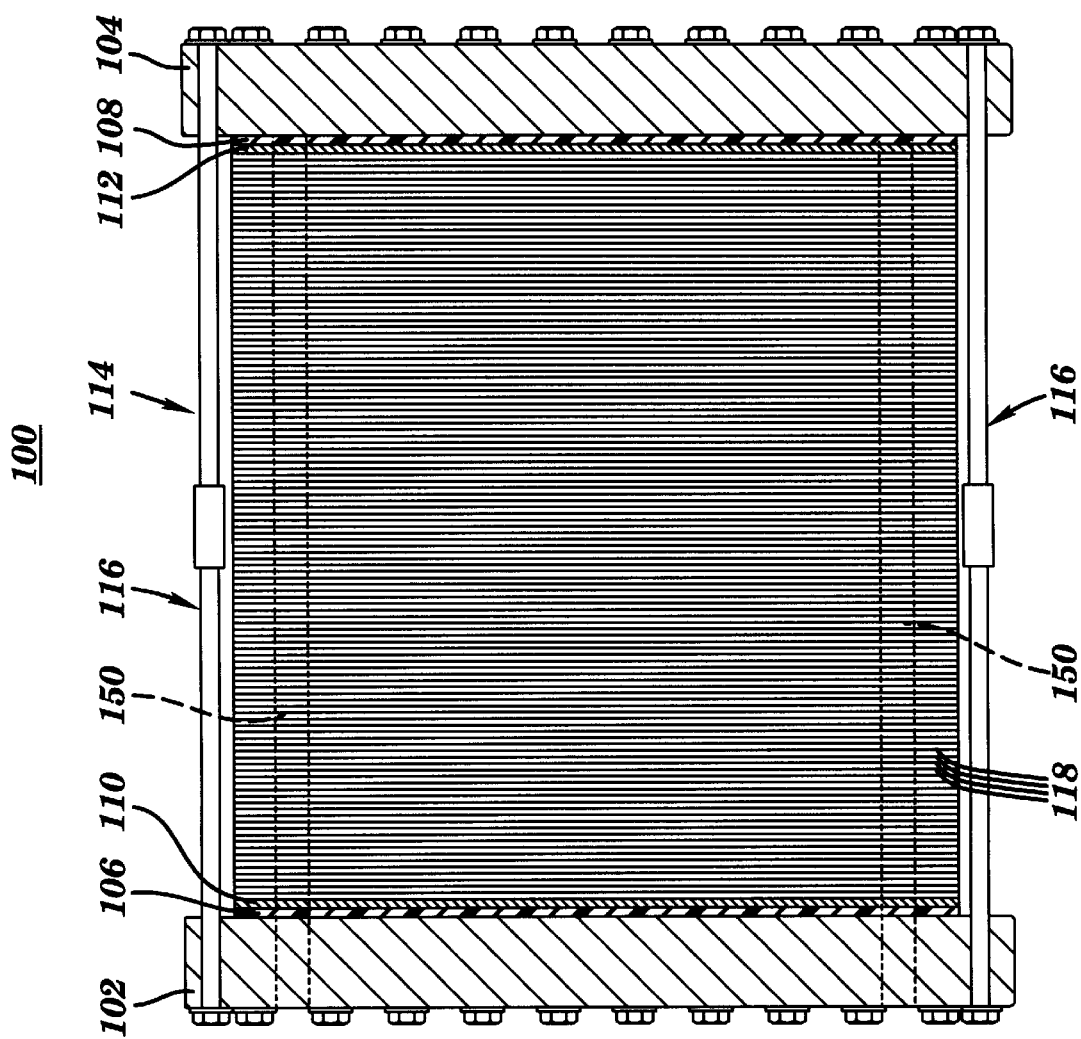
FIG. 1 is a sectional, elevation, side view of one example of a fuel cell assembly incorporating and using the isolator (s) of the present invention.

One example of a fuel cell assembly incorporating and using the novel features of the present invention is depicted in FIG. 1 and described in detail herein.

In this exemplary embodiment, a fuel cell assembly 100 includes end plates 102 and 104, insulation layers 106 and 108, and current collector/conductor plates 110 and 112, with a working section 114 therebetween. Further, the working section includes one or more active sections and can include a selected number of cooling sections, as will be understood by those skilled in the art. Also, a number of structural members 116 join the end plates, as is known in the art.

Working section 114 includes a number of layers 118. The layers generally form fluid manifolds 150 for supplying fluids to, removing fluids from, and otherwise communicating and/or servicing fluids as desired within the working section, as will be appreciated by those skilled in the art.

Figure 4:
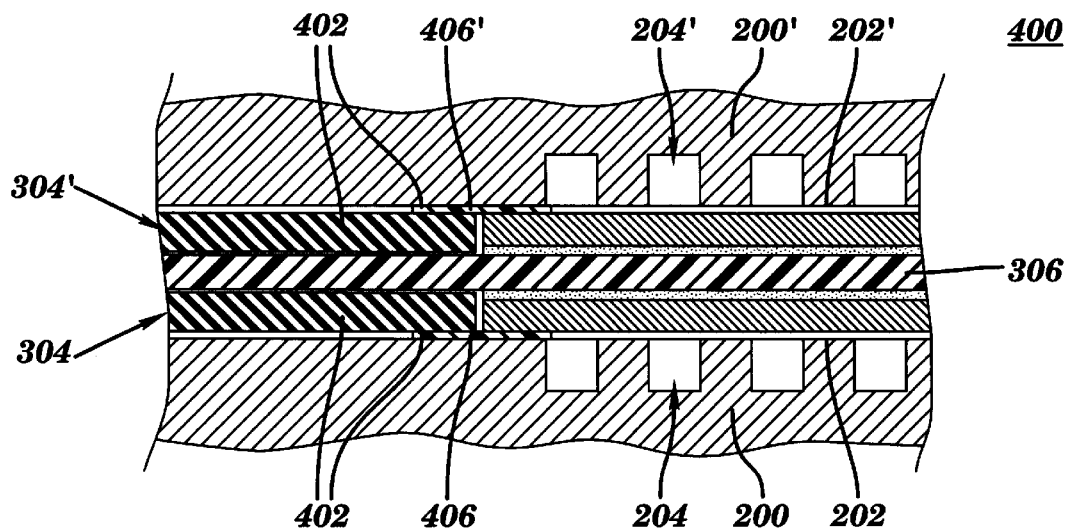
FIG. 4 is a cutaway, sectional, partial, side representation of isolators disposed in a fuel cell of the fuel cell assembly of FIG. 1.

Preferably, a plurality of layers 118 form one or more (e.g., one hundred and eight) PEM-type fuel cells 400 (FIG. 4). The construction and utilization of such fuel cells is known in the art. By connecting an external load (not shown) between electrical contacts (not shown) of current collector/conductor plates 110 and 112, one can complete a circuit for use of current generated by the one or more PEM-type fuel cells.

Figure 2:
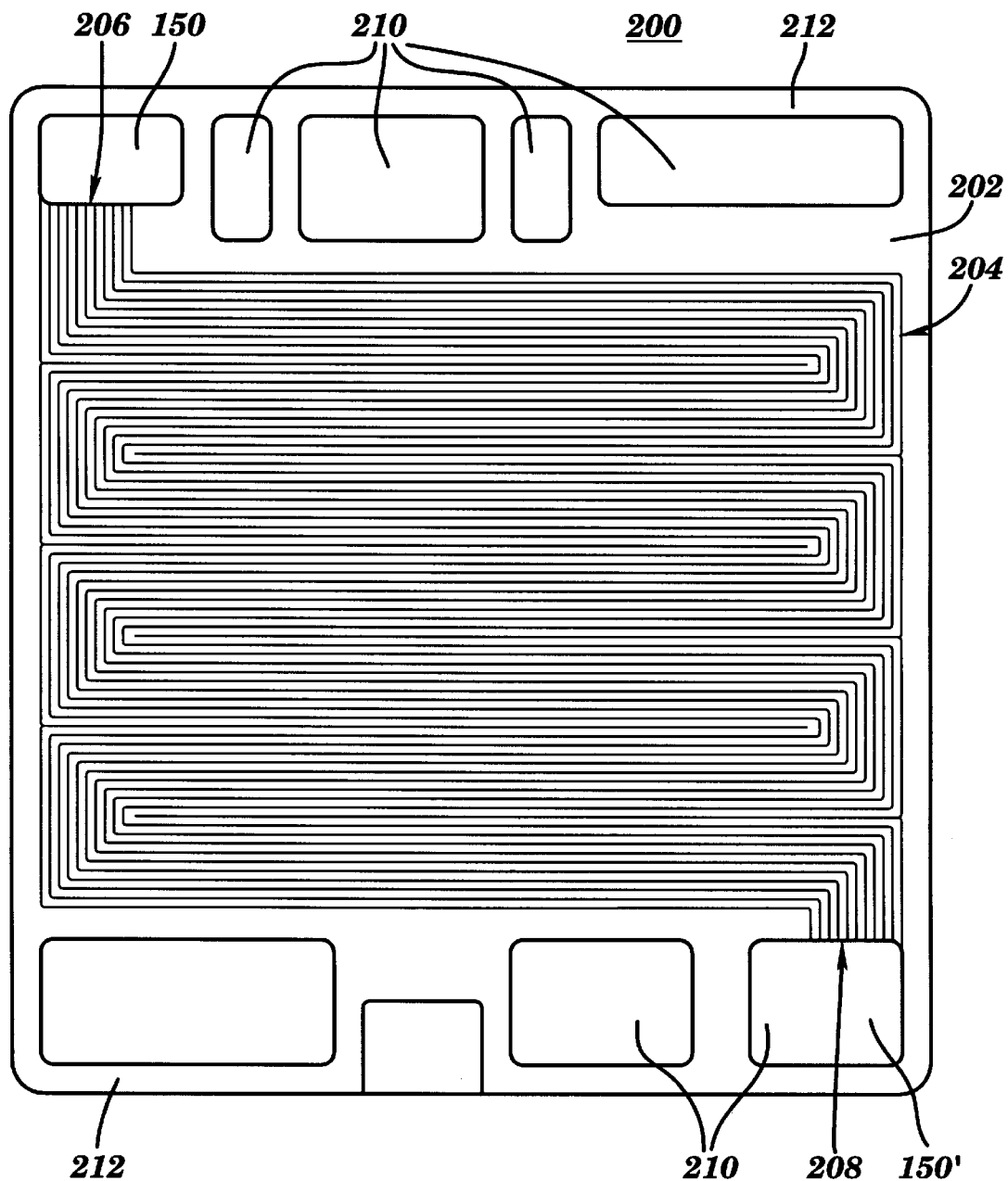
FIG. 2 is a plan view of an exterior face of one example of a flow field plate for a fuel cell in the fuel cell assembly of FIG. 1.

One example of a layer 118 of working section 114 is depicted in FIG. 2 as fluid flow plate 200. The plate has a fluid flow face 202 with a plurality of substantially parallel and generally serpentine flow channels 204 thereon. The flow channels receive and transmit one or more fluids through ports 206 and 208 which are in fluid communication with corresponding fluid manifolds 150 and 150'. For instance, the flow channels can include respective inlets 206 and outlets 208 in fluid communication with corresponding entry and exit fluid manifolds 150 and 150'.

In one preferred embodiment of the present invention, fluid flow plate 200 serves as a flow field plate and flow channels 204 serve as flow field channels which conduct fluid that includes reactant fluid for fuel cell assembly 100. The reactant fluid serves as fuel or oxidant for a given fuel cell 400 (FIG. 4). For instance, the flow field channels can carry reactant gas (e.g., a fuel such as hydrogen or an oxidant such as air/oxygen) as well as liquid (e.g., humidification and/or product water), as will be understood by those skilled in the art. Face 202 might be, for example, an exterior face of a bipolar, monopolar, or combined monopolar (e.g., anode cooler or cathode cooler) plate.

Figure 3:
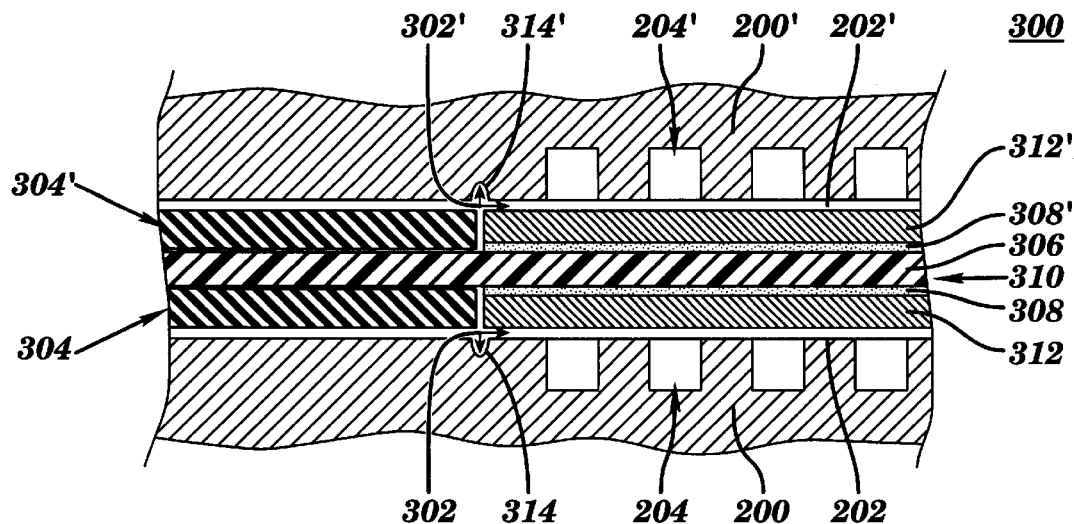
FIG. 3 is a cutaway, sectional, partial, side representation of flow field plates corroding in a fuel cell of a fuel cell assembly.

As discussed in detail further below, one or more isolators 402 (FIG. 4) serve to reduce harm to fuel cell assembly 100 from generally transverse electrochemical gradient(s) 302, 302' (FIG. 3), typically present during operation of a given fuel cell 300 (FIG. 3). Furthermore, fluid flow plates 200 can be formed from one or more metals which can survive or acceptably tolerate the oxidation and reduction operating environments at the anode and cathode sides, respectively, of a given fuel cell 400 (FIG. 4).

In one example, fluid flow plate 200 can be formed by machining stainless steel. In another example, the fluid flow plate might be formed from materials such as various forms of aluminum, and/or through plating with metals such as nickel and/or precious metals.

A typical fluid flow plate 200 might have dimensions of 8.0 to 10.0 in. height, 7.0 to 9.0 in. width, and 0.06 to 0.12 in. thickness. Also, a given flow channel 204 on face 202 might have cross-sectional dimensions of 0.04 to 0.06 in. width and 0.025 to 0.050 in. depth.

Furthermore, fluid flow plate 200 has a number of peripheral holes 210 therethrough, which can cooperate in formation of fluid manifolds of fuel cell assembly 100. In one embodiment, portions of the peripheral holes are defined by arcs or rims 212 that are fixed, attached, or connected to the fluid flow plate. These rims can have any desired number of components and can be formed, for example, by injection molding of plastic or from elastomer. Preferably, the perimeters of layers 118 are formed with minimal amounts of material disposed generally transversely beyond the active extent of working section 114 as well as the fluid manifolds of fuel cell assembly 100, as represented in FIG. 2.

As will be understood by those skilled in the art, gasketing material or gaskets 304, 304' (FIG. 4) seal peripheral holes 210 and cooperate with the longitudinal extents of layers 118 in formation of the fluid manifolds. A given gasket 304, 304' might take the form of, for instance, a frame gasket made from a material manufactured by E. I. Du Pont De Nemours Company and sold under the trademark TEFLON®. Alternatively, multiple O-ring gaskets might be used.

For purposes of illustration, FIG. 3 depicts fuel cell 300 which has been harmed through corrosion of flow field plates 200 and 200'. In particular, flow field plate 200 might serve as an anode side of the fuel cell, and flow field plate 200' might serve as a cathode side of the fuel cell. That is, face 202 might be an anode face, and face 202' might be a cathode face. For instance, flow field channels 204 might carry hydrogen, as fuel, and humidification water. Further, flow field channels 204' might carry air/oxygen, as oxidant, as well as humidification water and/or product water, as will be understood by those skilled in the art.

Fuel cell 300 includes membrane or solid electrolyte 306. Preferably, solid electrolyte 306 is a solid polymer electrolyte made using a polymer such as the material manufactured by E. I. Du Pont De Nemours Company and sold under the trademark NAFION®. Further, an active electrolyte such as sulfonic acid groups might be included in this polymer. In another example, the solid polymer electrolyte might be formed from a product manufactured by W. L. Gore & Associates (Elkton, Md.) and sold under the trademark GORE-SELECT®. Moreover, catalysts 308 and 308', such as platinum, which facilitate chemical reactions are applied to the anode and cathode sides, respectively, of the solid polymer electrolyte. This unit can be referred to as a membrane electrode assembly (hereinafter "MEA") 310. The MEA might be formed from a product manufactured by W. L. Gore & Associates and sold under the trade designation PRIMEA 5510-HS.

MEA 310 is sandwiched between anode and cathode gas diffusion layers (hereinafter "GDLs") 312 and 312', respectively, which can be formed from a resilient and conductive material such as carbon fabric. In one embodiment of a gas diffusion layer, porous carbon cloth or paper is infused with a slurry of carbon black and sintered with TEFLON® material. The anode and cathode GDLs serve as electrochemical conductors between catalyzed sites of solid polymer electrolyte 306 and the fuel (e.g., hydrogen) and oxidant (e.g., air/oxygen) which each flow in anode and cathode flow channels 204 and 204', respectively. Further, the GDLs also present to the surfaces of the MEA a combination of microscopic porosity and macroscopic porosity. Microscopic porosity allows reactant gas molecules to pass generally longitudinally from the flow channels to a surface of the MEA. Macroscopic porosity allows product water formed at the cathode surface of the MEA to be removed therefrom by flowing generally longitudinally to the cathode flow channels, in order to prevent flooding of the catalyst particles.

In one example, water having a pH value of approximately five might be added to a given reactant gas stream conducted by flow field channels 204, 204'. The water would desirably serve to humidify membrane 306. However, this humidification water can disadvantageously function as an electrolyte that facilitates or contributes to corroding of flow field plate 200, 200', as described herein.

During operation of a given fuel cell, a voltage potential exists in a generally transverse direction with respect to a given face 202, 202'. This voltage potential arises because of reactant fluid carried in flow field channels 204, 204' in the presence of electrolyte, such as humidification water and solid electrolyte 306. Further, at exemplary and approximate location 314, 314' depicted as generally transversely outward from, or peripherally beyond, the outermost flow field channel 204, 204', respectively, the potential difference is largest. As will be appreciated by those skilled in the art, a concentration gradient of reactant fluid on a given side of membrane 306 can undesirably produce a crevice corrosion process.

For instance, on anode face 202, a different amount of fuel (e.g., hydrogen) is delivered to the transversely outermost flow field channel 204 than is delivered at approximate location 314, depicted at the periphery beyond the flow field channels, where no fuel is intended to be delivered. So, in the presence of electrolyte, such as humidification water and solid electrolyte 306, transverse electrochemical gradient 302 is formed generally between outermost flow field channel 204 and approximate location 314, located at the outer peripheral edge of gas diffusion layer 312.

Similarly, on cathode face 202', a different amount of oxidant (e.g., air/oxygen) is delivered to the transversely outermost flow field channel 204' than is delivered at approximate location 314', depicted at the periphery beyond the flow field channels, where no oxidant is intended to be delivered. Therefore, in the presence of electrolyte, such as humidification water and solid electrolyte 306, transverse electrochemical gradient 302' is formed generally between outermost flow field channel 204' and approximate location 314', located at the outer peripheral edge of gas diffusion layer 312'.

The presence of electrolyte promotes balancing of voltage potentials along a given face 202, 202'. In harmed fuel cell 300, the electrolyte undesirably allows metallic ions from approximate location 314, 314' to counteract the generally transverse electrochemical gradient 302, 302', respectively, with resultant corrosion of flow field plate 200, 200', respectively, and consequent embrittlement and/or poisoning of membrane 306, as described herein. Moreover, the magnitude of the generally transverse electrochemical gradient directly determines the rate of removal of metallic ions from the flow field plate. That is, a larger voltage potential difference yields a faster rate of damage or harm to fuel cell assembly 100.

During experimental testing, relatively high rates of corrosion at approximate location 314, 314' have been observed with fluid flow plate 200, 200', respectively, formed from such materials as stainless steel and/or various forms of aluminum, as well as materials plated with metals such as nickel and/or precious metals. Corrosion at approximate location 314', on the cathode side, has been observed to be particularly virulent. Furthermore, plating of a metal substructure, such as a relatively low cost and/or relatively light weight metal, with a noble, or more noble, metal can result in the exterior of the plate becoming relatively quickly corroded, thereby undesirably exposing the substructure to potentially deleterious effects.

Even with minimal occurrence of corrosion, sufficient quantities of metallic ions can become freed for disadvantageous combination with and embrittlement of membrane 306. In particular, ions produced at face 202, 202' can undesirably contact the membrane, with disadvantageous alteration of the chemical and/or physical characteristics of the membrane. Undesirably, embrittlement of the membrane can lead to cracking and/or leaking, which degrade performance of fuel cell 300. Namely, the effectiveness of the membrane as a proton exchange medium and/or the strength of the membrane can be reduced. That is, degrading of the anode and/or cathode half-cell reactions can render the fuel cell ineffective and/or useless.

For instance, were one to electrically couple a particular membrane 306 to a stainless steel flow field plate within a given fuel cell 300, then the membrane could undesirably become discolored within twenty to thirty hours. This discoloration of the membrane signals that a physical and/or chemical process is occurring. Thereafter, the membrane embrittles and/or crumbles. Notably, this harm to the membrane can occur relatively long before any harm to the stainless steel flow field plate might be detected. The present invention desirably reduces this type of harm to fuel cell assembly 100, as described herein.

As depicted in FIG. 4, fuel cell 400 advantageously includes isolating material 406, 406' disposed between solid electrolyte 306 and face 202, 202, respectively, of flow field plate 200, 200', respectively. In one preferred embodiment, gasketing material 304, 304' is disposed between the solid electrolyte and the face. Further, a portion of the isolating material is preferably disposed between the gasketing material and the face.

In accordance with the present invention, isolating material 406, 406' and gasketing material 304, 304', respectively, can cooperate to form isolator(s) 402. Isolator(s) 402 can serve to isolate electrochemically an especially vulnerable portion of face 202, 202', such as approximate location 314, 314' (FIG. 3), respectively, from generally transverse electrochemical gradient 302, 302' (FIG. 3), respectively.

Preferably, isolating material 406, 406' is impervious to electrolyte and ions. For instance, the isolating material might be formed from epoxy and/or enamel (e.g., paint). In one example, the isolating material might be formed from a product manufactured by SPRAYON™ Products (Bedford Heights, Ohio) and sold under the trade designation #601, Red Insulating Varnish.

Isolating material 406, 406' is preferably disposed over region(s) of expected deleterious concentration gradient(s). For instance, the isolating material can extend on face 202, 202' from just over the edge of the outermost flow field channel 204, 204', respectively, to a position located generally transversely outward therefrom and securely between gasketing material 304, 304', respectively, and the face. For example, the isolating material might extend on the face a distance of approximately one eighth to three eights of an inch generally transversely inward and outward from the outermost edge of gas diffusion layer 312, 312'. This distance can be proportionately increased or decreased for relatively larger or smaller, respectively, transverse dimensions of flow field plates 200, 200'. Further, the isolating material might have an approximate thickness of 0.0005 to 0.0020 in.

In one preferred embodiment, isolator(s) 402 are located largely along the perimeter of a region of face 202, 202' having substantially parallel and generally serpentine flow channels 204, 204' (FIG. 2), respectively, thereon. Multiple instances of isolating material 406 and 406' can circumscribe the entire periphery of GDLs 312 and 312', respectively. Further, a desired number, including all, of flow field plates 200, 200' in fuel cell assembly 100 can employ the isolator(s). A fuel cell 400 (FIG. 4) including isolator(s) 402 might operate continuously for over two hundred and fifty hours without exhibiting harmful effects from embrittlement and/or corrosion. In contrast, a fuel cell 300 (FIG. 3) might show significant adverse effects in as few as eight hours of continuous operation.

Moreover, the present invention can prevent corrosion even of flow field plates 200, 200' that have previously partially corroded. Initially, a known cleanup procedure can be performed on the damaged flow field plate. Isolating material 406, 406' can then be installed, coated, or applied over the prepared surface for advantageous prevention of further corrosion of the plate.

A given fluid flow plate 200 which conducts fluids on both faces might be configured so the fluids have, for example, parallel flow or counter flow among the various flow channels 204. In particular, a parallel flow configuration might generally transversely align flow on the opposing faces 202 by positioning corresponding first and second inlets at opposite sides of a first corner of the plate, and respective first and second outlets at opposite sides of a generally diametrically opposed second corner of the plate. Further, a counter flow design might provide flow in generally transversely opposite directions on opposing faces 202 by placing first inlet(s) and second outlet(s) at opposite sides of a first corner of the plate, and first outlet(s) and second inlet(s), respectively, at opposite sides of a generally diametrically opposed second corner of the plate.

Operation of fuel cell assembly 100 can include periods or intervals of action and inaction, such as an active use followed by idling. Also, the fuel cell assembly can be employed for varied (e.g., automotive to aerospace to industrial) applications, in various environments.

Numerous alternative embodiments of the present invention exist. Fluid flow plate 200 and/or fluid manifold(s) 150, 150' could serve any desired function in any position of fuel cell assembly 100. Further, fluid flow face 202 could easily have any number of flow channels 204. Any flow channel 204 could easily have any appropriate shape or structure. Also, flow channels 204 could easily be configured to deviate, to any desired degree, from parallel alignment and/or serpentine design. Moreover, any of ports/inlets 206 and/or ports/outlets 208 could employ any mechanism for fluid communication between appropriate flow channel(s) 204 and fluid manifold(s) 150, 150'. Furthermore, isolator(s) 402 could easily be employed in any appropriate type(s) of fuel cell(s). Additionally, working section 114 could easily include any desired type(s) of fuel cell(s).

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. Isolator of a fuel cell assembly, said fuel cell assembly having a longitudinal axis and comprising a flow field plate extending generally transversely at a first position along said longitudinal axis, and a solid electrolyte extending generally transversely at a second position along said longitudinal axis, said isolator comprising:

isolating material disposed between a first section of said solid electrolyte and a second section of an exterior face of said flow field plate, said second section including an effective boundary between first and second parts thereof;

said first part including a flow field channel thereon for carrying fluid, reactant fluid carried by said flow field channel forming a generally transverse electrochemical gradient across said effective boundary; and said isolating material serving to isolate electrochemically a portion of said second part from said generally transverse electrochemical gradient.

2. The isolator of claim 1, wherein said flow field plate is formed from one or more metals and said isolating material serves to protect a portion of said first section from metallic ions.

3. The isolator of claim 1, wherein a portion of said isolating material extends generally transversely over a portion of said flow field channel.

4. The isolator of claim 1, wherein said isolating material extends largely along a perimeter of said face.

5. The isolator of claim 1, wherein said isolating material is mechanically coupled to said second section.

6. The isolator of claim 1, wherein said isolating material includes one or more of epoxy and enamel.

7. The isolator of claim 1, wherein said solid electrolyte includes a solid polymer electrolyte.

8. The isolator of claim 1, wherein said solid electrolyte and said flow field plate comprise a portion of a PEM-type fuel cell.

9. The isolator of claim 1, wherein said flow field plate includes one or more of stainless steel and aluminum.

10. The isolator of claim 1, further comprising a gas diffusion layer disposed between said first section and said second section.

11. The isolator of claim 1, wherein said first part includes a plurality of substantially parallel and generally serpentine flow field channels thereon.

12. The isolator of claim 1, wherein said isolating material largely circumscribes a plurality of generally serpentine flow field channels on said first part.

13. Isolator of a fuel cell assembly, said fuel cell assembly having a longitudinal axis and comprising a flow field plate extending generally transversely at a first position along said longitudinal axis, and a solid electrolyte extending generally transversely at a second position along said longitudinal axis, said isolator comprising:

isolating material disposed between a first section of said solid electrolyte and a second section of an exterior face of said flow field plate, said second section including an effective boundary between first and second parts thereof;

gasketing material disposed between said first section and said second part, a portion of said isolating material being disposed between said gasketing material and said second part;

said first part including a flow field channel thereon for carrying fluid, reactant fluid carried by said flow field channel forming a generally transverse electrochemical gradient across said effective boundary; and one or more of said isolating material and said gasketing material serving to isolate electrochemically a portion of said second part from said generally transverse electrochemical gradient.

14. The isolator of claim 13, wherein said flow field plate is formed from one or more metals and said one or more of said isolating material and said gasketing material serve to protect a portion of said first section from metallic ions.

15. The isolator of claim 13, wherein a portion of said isolating material extends generally transversely over a portion of said flow field channel.

16. The isolator of claim 13, wherein one or more of said isolating material and said gasketing material extend largely along a perimeter of said face.

17. The isolator of claim 13, wherein said isolating material is mechanically coupled to said second section.

18. The isolator of claim 13, further comprising a gas diffusion layer disposed between said first section and said second section.

19. The isolator of claim 13, wherein one or more of said isolating material and said gasketing material largely circumscribe a plurality of generally serpentine flow field channels on said first part.

20. A method of isolating a generally transverse electrochemical gradient in a fuel cell assembly, said fuel cell assembly having a longitudinal axis and comprising a flow field plate extending generally transversely at a first position along said longitudinal axis, and a solid electrolyte extending generally transversely at a second position along said longitudinal axis, said method comprising:

disposing isolating material between a first section of said solid electrolyte and a second section of an exterior face of said flow field plate, said second section including an effective boundary between first and second parts thereof; and forming on said first part a flow field channel for carrying fluid, reactant fluid carried by said flow field channel forming a generally transverse electrochemical gradient across said effective boundary;

wherein said isolating material serves to isolate electrochemically a portion of said second part from said generally transverse electrochemical gradient.

* * * * *